(12) United States Patent  (10) Patent No.: US 8,573,158 B2
Lumax  (45) Date of Patent: Nov. 5, 2013

(54) CRATE FOR TRANSPORTING ANIMALS

(76) Inventor: George Lumax, Swan River (CA)

( * ) Notice: Subject to any disclaimer, the term of this patent is extended or adjusted under 35 U.S.C. 154(b) by 366 days.

(21) Appl. No.: 13/160,659

(22) Filed: Jun. 15, 2011

(65) Prior Publication Data

US 2011/0303159 A1    Dec. 15, 2011

Related U.S. Application Data

(60) Provisional application No. 61/354,792, filed on Jun. 15, 2010.

(51) Int. Cl.
*A01K 1/00* (2006.01)
(52) U.S. Cl.
USPC .......................................................... 119/496
(58) Field of Classification Search
USPC ........................... 119/496, 482, 484, 473, 416
See application file for complete search history.

(56) References Cited

U.S. PATENT DOCUMENTS

| | | | | |
|---|---|---|---|---|
| 3,712,504 A | * | 1/1973 | Petersen | 220/668 |
| 3,990,399 A | * | 11/1976 | Davis, Jr. | 119/480 |
| 4,125,632 A | * | 11/1978 | Vosti et al. | 426/111 |
| 5,533,466 A | * | 7/1996 | Kohus et al. | 119/459 |
| 6,328,178 B1 | * | 12/2001 | Hsu | 220/7 |

* cited by examiner

*Primary Examiner* — Yvonne Abbott
(74) *Attorney, Agent, or Firm* — Adrian D Battison; Ade & Company Inc.

(57) ABSTRACT

A crate for transporting a plurality of animals particularly horses is formed by a rectangular container to be placed on a supporting base and defined by two side panels and two end panels connected edge to edge. Each panel is defined by a frame comprising upstanding end posts and top and bottom cross rails and a sheet attached to the frame to at least partly close the frame and thus confine the animals within the container. The sheet of at least the side panels is bent to form a horizontally extending outwardly bulged section at least partly along the panel at a height on the panel spaced from a bottom edge and from a top edge and arranged at a height on the panel of the order of 4 feet from the base to receive the body of the animals when standing on the base to provide additional room for the animals without increasing the footprint of the crate.

19 Claims, 5 Drawing Sheets

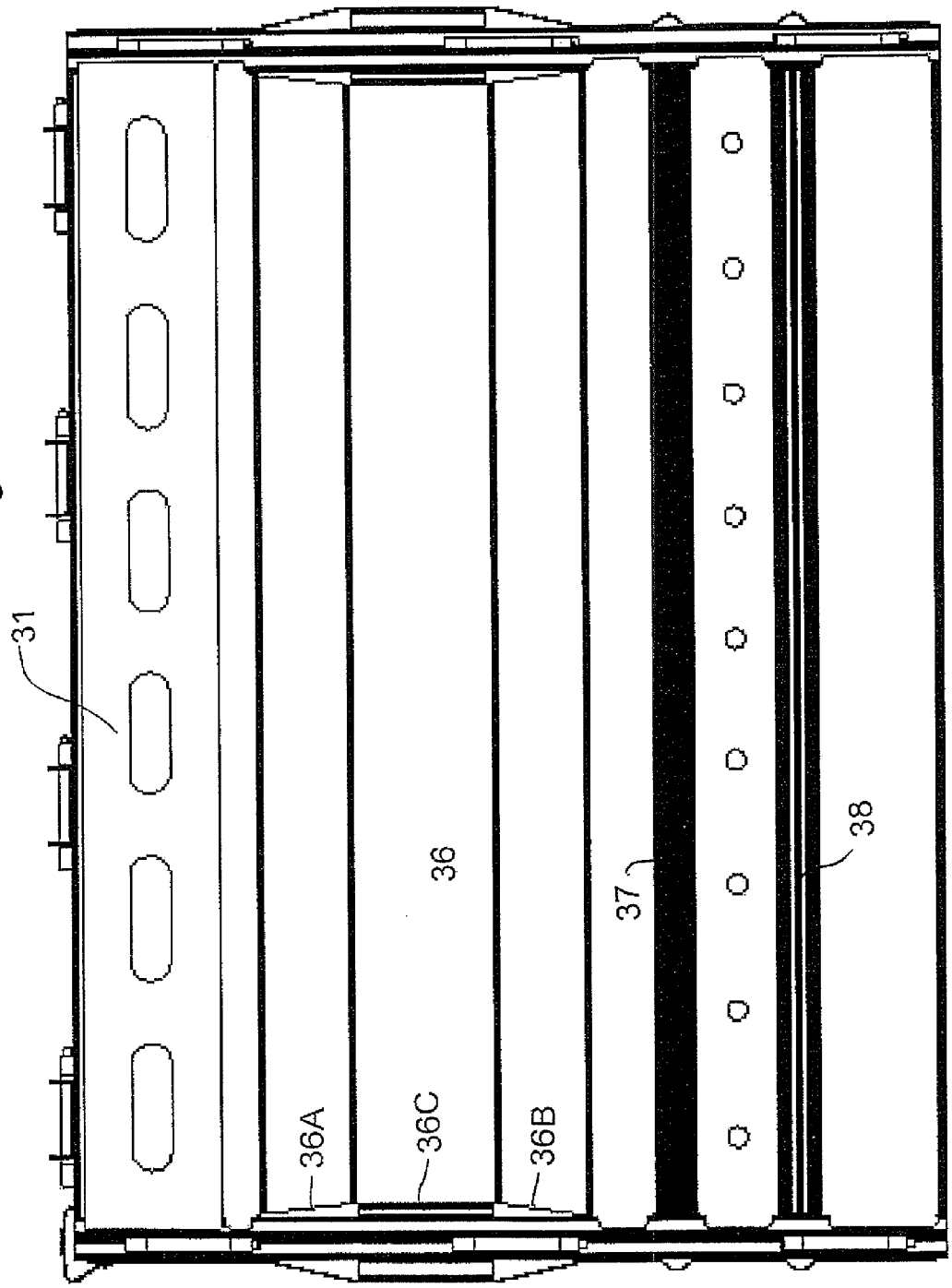

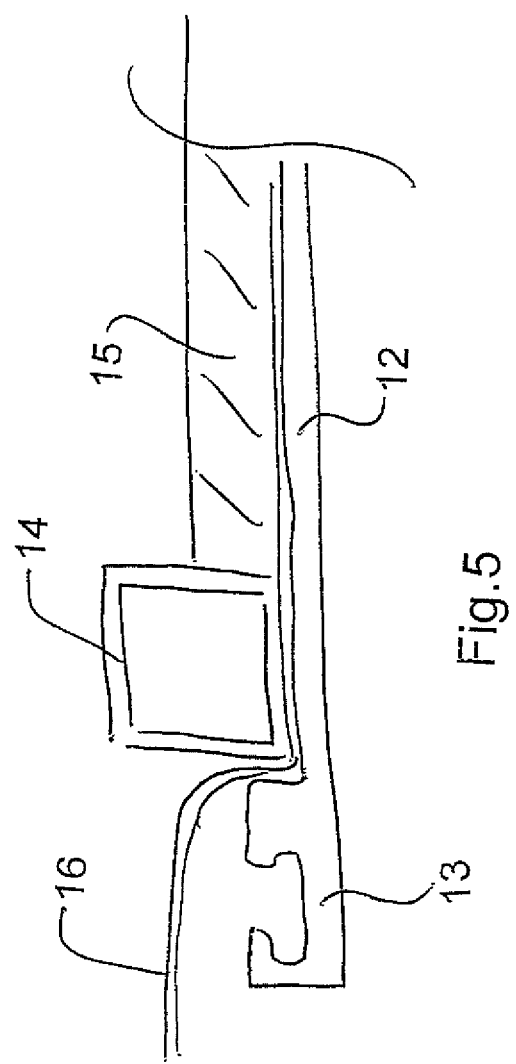

CRATE FOR TRANSPORTING ANIMALS

This application claims the benefit under 35 USC 119 of provisional application 61/354,792 filed Jun. 15, 2010.

This invention relates to a crate for transporting animals particularly but not necessarily horses where a number of the horses are located side by side in a single crate. The crate is particularly but not necessarily designed for air transportation.

BACKGROUND OF THE INVENTION

Horses are commonly transported by air freight in a common crate which is dimensioned for loading in the airplane and hence has a base dimension of the order of 8 feet by 10 feet.

This dimension is fixed by the transportation system and hence the crate to be carried on this base must fit onto the base. The standard technique to form the crate is by manufacturing four panels connected at right angles typically from wood frame covered on the inside by sheathing of plywood. The four panels are then knocked down at the delivery location and returned in flat. Up to now this has been considered adequate and the amount of room available within the predetermined dimensions has been considered adequate to contain four horses.

SUMMARY OF THE INVENTION

It is one object of the invention to provide an improved crate of this general type.

According to one aspect of the invention there is provided an apparatus for transporting a plurality of animals comprising:

a plurality of panels arranged to be connected edge to edge to form a rectangular container to be placed on a supporting base;

each panel comprising a frame comprising upstanding posts and cross rails and a sheet attached to the frame to at least partly close the frame and thus confine the animals within the container;

wherein the sheet of at least one of the panels is bent to form an outwardly bulged section extending at least partly along the panel at a height on the panel spaced from a bottom edge and from a top edge and arranged at a height on the panel to receive the body of the animals when standing on the base.

Preferably the panels include two side panels to be arranged parallel and two end panels to be arranged parallel and at right angles to the side panels.

Preferably each of the side panels and one of the end panels is shaped to include a respective outwardly bulged section. The other end panel which contains a door can be flat or can also include a bulged section either in the part separate from the door or in the whole of the panel.

Preferably the outwardly bulged section of each side panel and one end panel extends along the full length of the side panel although it may be only a part of the length.

Preferably the panel includes a single outwardly bulged section at the required height of the body of the animal. However additional sections below the main bulged section can be provided.

Preferably the panel includes horizontal stiffening ribs at a position above and/or below the outwardly bulged section to stiffen the sheet metal panel.

Preferably the container has an open top to allow air access. This is typically covered by straps and by a netting to contain the animals and hold the structure integral for lifting and movement.

Preferably the panels are connected together by pins at the edges of the panels interconnecting aligned collars. However other connection techniques can be used.

Preferably one end panel has a door.

Preferably the door comprises a sheet which slides vertically in guide tracks. Other door constructions including hinged panels can be used. Typically the door panel is flat without a bulged section, but more complex door panel shapes can be used.

Preferably that part of the panel separate from the door has an outwardly bulged section.

Preferably the frame comprises a pair of end posts, a top rail and a bottom rail.

Preferably the outwardly bulged section has a height greater than 15 inches. This can lie in the range 15 inches to roughly 30 inches so that it is only large enough to provide the required increase in dimension for the animals without interfering with the outside dimensions at other locations which are not necessary.

Preferably the outwardly bulged section is defined by a vertical wall section parallel to the frame, and inclined top and bottom wall sections above and below the flat section and extending outwardly from the frame to the vertical wall section.

Preferably the outwardly bulged section has a bulge distance of at least 2.0 inches and preferably in the range 2 to 4 inches.

Preferably the metal sheet is attached by welding to an outside surface of the frame and the outwardly bulged section extends outwardly therefrom.

Preferably the outwardly bulged section is located at a distance of the order of 4.0 feet from the base.

Preferably the base extends outwardly from a bottom of each panel and the outwardly bulged section does not extend outwardly to an distance greater than the base. The base may have an other edge flange projecting roughly 3.0 inches outwardly so that the bulge is contained within this footprint.

Preferably the ends of the outwardly bulged section are tapered toward the outer surface of the section so as to allow stacking of the panels one on top of the other while the outwardly bulged sections nest.

BRIEF DESCRIPTION OF THE DRAWINGS

One embodiment of the invention will now be described in conjunction with the accompanying drawings in which:

FIG. 4 is front elevational view of one side panel.

FIG. 5 is a cross sectional view the base and one wall.

Figure 1:
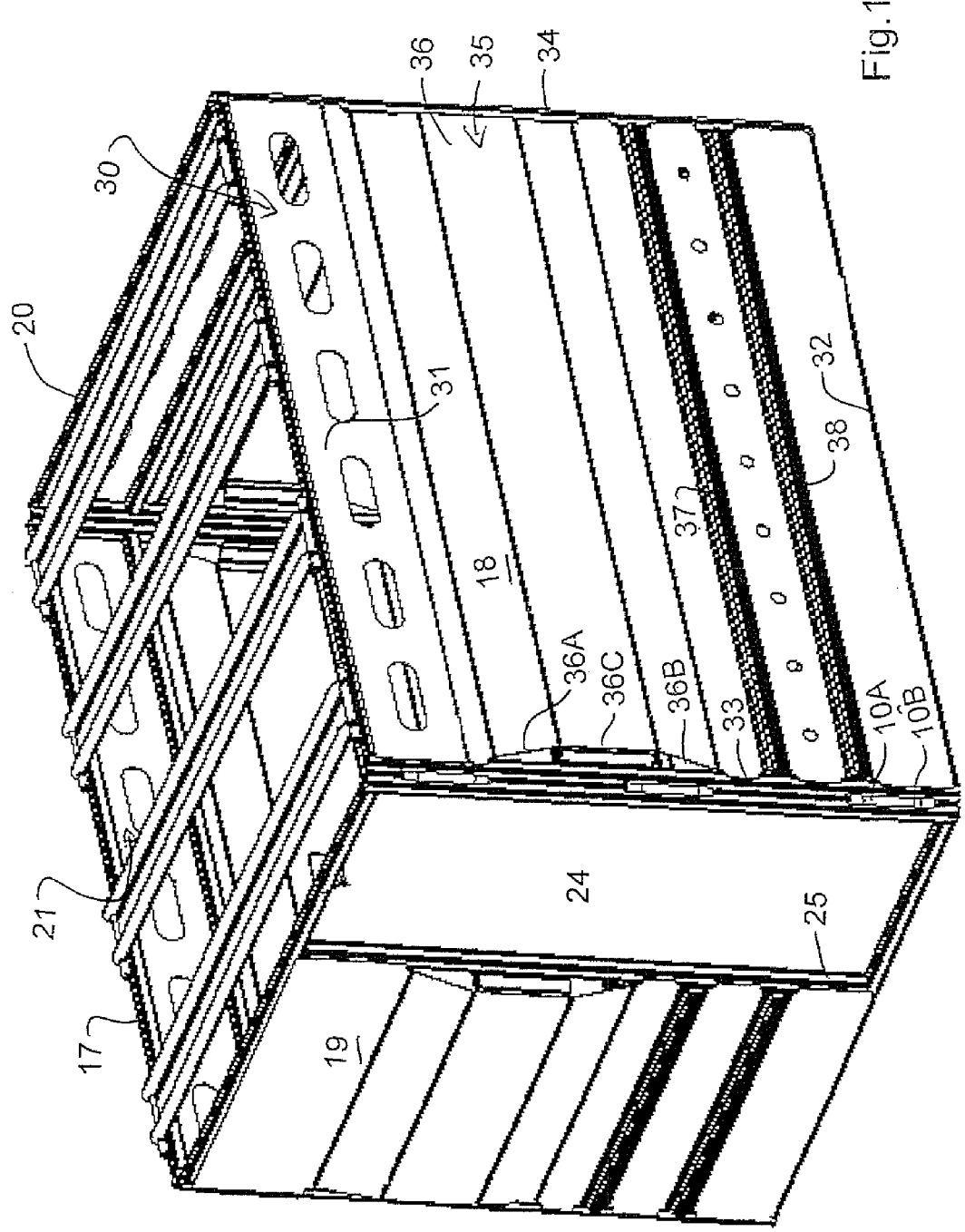
FIG. 1 is an isometric view of a crate according to the present invention.
Figure 2:
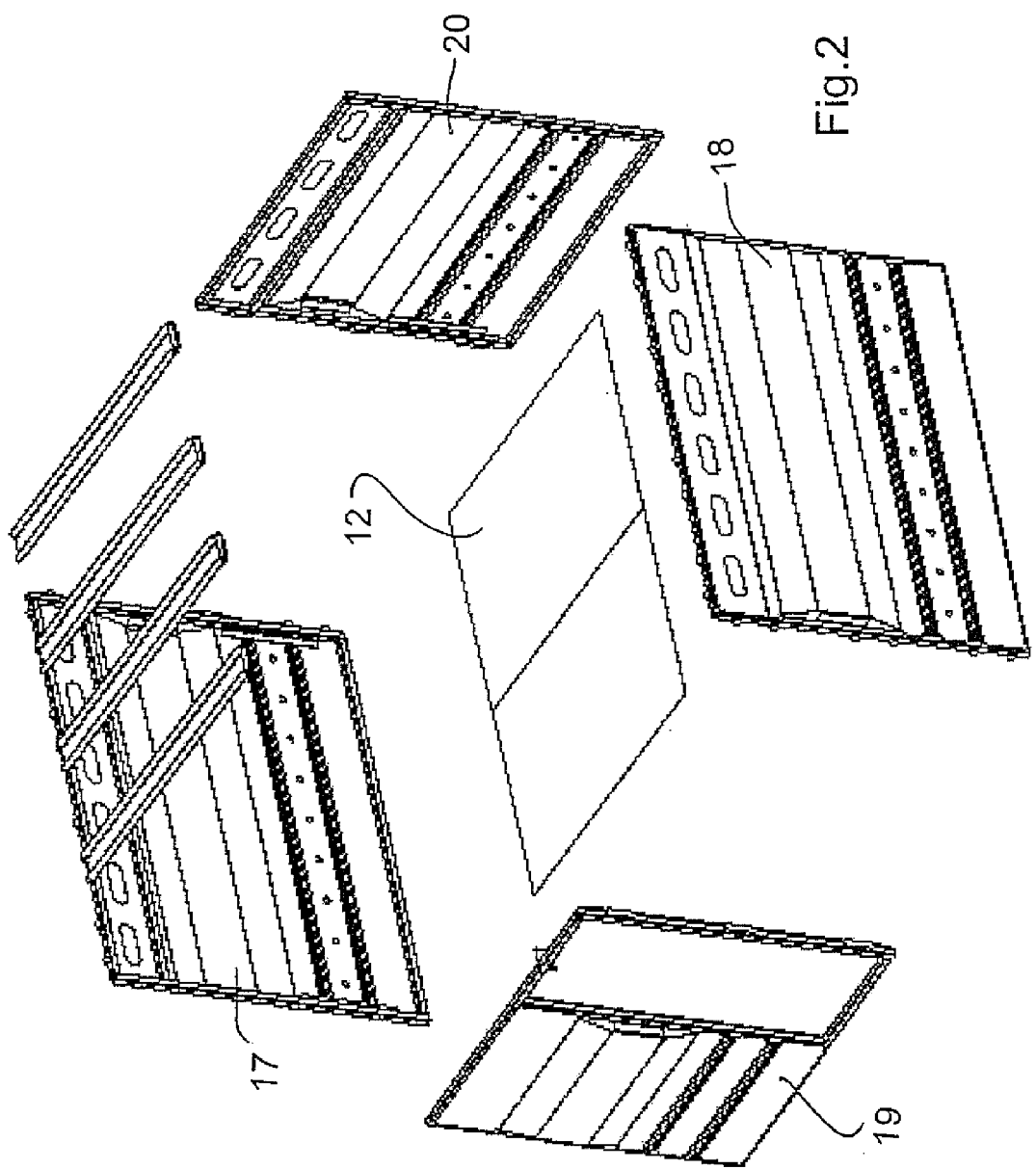
FIG. 2 is an exploded view of the crate of FIG. 1.
Figure 3:
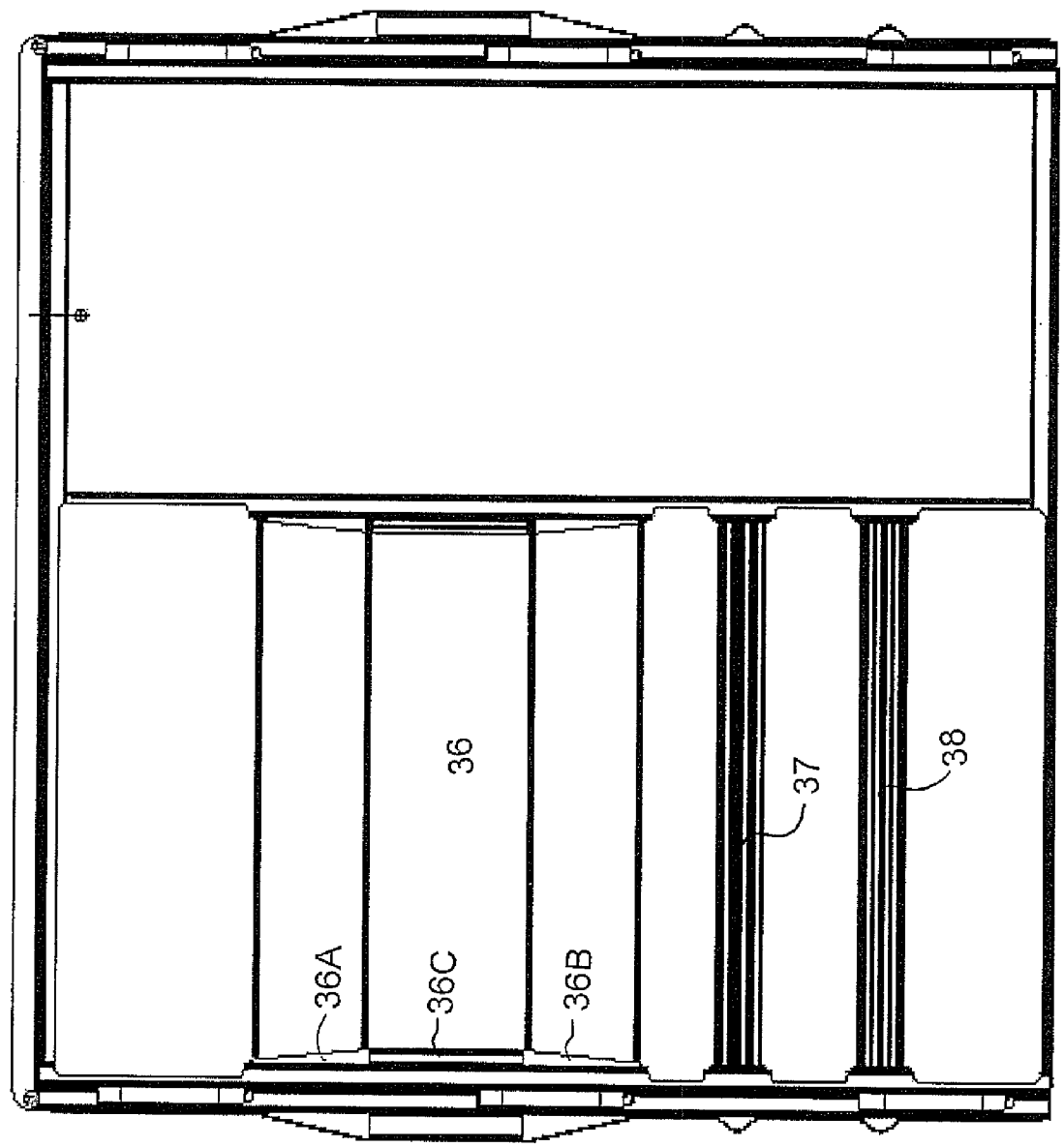
FIG. 3 is front elevational view of one end panel.

The dimensions shown in the Figures are exemplary only

In the drawings like characters of reference indicate corresponding parts in the different figures.

DETAILED DESCRIPTION

The apparatus for transporting a plurality of animals provides a crate 10 mounted on a base 11. The base 11 forms a flat metal plate with logistic connectors along each side edge by which straps and netting can be connected to the base to extend over the crate. The base has its side edges which project outwardly beyond the crate so as to receive a bottom rail 14 of each panel adjacent the edge but recessed from the edge by the width of the logistic rail which is typically of the order of 3 inches. Inside the rails 14 is provided a suitable floor panel 15 on which the animals stand and this covers a sheet 16 of a plastics material passing under the floor and over the side edges for containing waste materials.

The crate is formed by a plurality of panels including two side panels 17 and 18 and two end panels 19 and 20 arranged to be connected edge to edge to form a rectangular container to be placed on the supporting base 11. A plurality of bars 21 extend across the top side to side to hold the structure stable and to receive the straps (not shown). The panels are connected together at the sides by pins 10A in aligned collars 10B.

The side panels differ from the end panels by dimension as shown and by the fact that the side panels include top horizontal bars 22 and 23 which provide open spaces for ventilation. One of the end panels differs from the side panels by the fact that the end panel includes a flat door 24 which can slide upwardly on guide tracks 25 between one end post and an intermediate post.

Each panel includes a frame 30 comprising upstanding posts 33 and 34 and top and bottom cross rails 31, 32 and a sheet 35 attached to the frame on the outside of the frame to at least partly close the frame and thus confine the animals within the container.

The sheet 35 is bent to form an outwardly bulged section 36 extending at least partly along the panel at a height on the panel spaced from a bottom edge and from a top edge and arranged at a height on the panel to receive the body of the animals when standing on the base 11. Thus each of the side panels and one of the end panels is shaped to include a respective outwardly bulged section 36 along its full length and the other of the end panels includes the bulged section at its part separate from the door.

Each panel includes a single outwardly bulged section 36 so that the remainder of the sheet is basically flat on the outside surface of the frame. However the panel includes horizontal stiffening ribs 37 and 38 at a position below the outwardly bulged section.

The outwardly bulged section 36 is defined by a vertical wall section 36C parallel to the frame which has a height greater than 15 inches, and inclined top and bottom wall sections 36A and 36B extending outwardly from the frame to the vertical wall section. The outwardly bulged section 36C has a bulge distance from the outside of the frame of at least 2.0 inches. The outwardly bulged section is located at a distance of the order of 4.0 feet from the base so as to be aligned with the body of the animal. Of course this can be varied depending on the size of the animal to be contained.

The base extends outwardly from a bottom of each panel to a distance of the order of 3 inches so that the outwardly bulged section does not extend outwardly to an distance greater than the base.

The ends of the three walls 36A, 36B and 36C of the outwardly bulged section are all tapered from the outside surface of the frame toward the outer surface of the section so as to allow stacking of the panels one on top of the other while the outwardly bulged sections nest. This tapering is also applied to the ends of the ribs 37 and 38 so that the panels can be stacked with the nesting allowing the stacking height to be equal only to the thickness of the tubes forming the frame and the thickness of the sheet.

Despite the small change to the structure provided by the bulged sections this has been found to provide an increase in the area available to the animals at the key location of their body height from approximately 17 square feet to over 20 square feet which is surprisingly sufficient to reduce the confinement stress on the animals allowing them to be transported while standing in relative comfort side by side across the crate from one side to the other. They can be arrange head to tail or all aligned. This is achieved without increasing the overall footprint or shipping dimensions of the crate.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for transporting a plurality of animals comprising:
   a plurality of panels arranged to be connected edge to edge to form a rectangular container to be placed on a supporting base;
   each panel comprising a frame comprising upstanding posts and cross rails and a sheet attached to the frame to at least partly close the frame and thus confine the animals within the container;
   wherein the sheet of at least one of the panels is bent to form an outwardly bulged section extending at least partly along the panel at a height on the panel spaced from a bottom edge and from a top edge and arranged at a height on the panel to receive the body of the animals when standing on the base.

2. The apparatus according to claim 1 wherein the panels include two side panels to be arranged parallel and two end panels to be arranged parallel and at right angles to the side panels.

3. The apparatus according to claim 2 wherein each of the side panels and at least one of the end panels is shaped to include a respective outwardly bulged section.

4. The apparatus according to claim 3 wherein the outwardly bulged section of each side panel and at least one of the end panels extends along the full length of the side panel.

5. The apparatus according to claim 1 wherein the panel includes a single outwardly bulged section.

6. The apparatus according to claim 1 wherein the panel includes horizontal stiffening ribs at a position above and/or below the outwardly bulged section.

7. The apparatus according to claim 1 wherein the container has an open top.

8. The apparatus according to claim 1 wherein the panels are connected together by pins.

9. The apparatus according to claim 1 wherein one end panel has a door.

10. The apparatus according to claim 9 wherein the door comprises a sheet which slides vertically in guide tracks.

11. The apparatus according to claim 9 wherein that part of the panel separate from the door has an outwardly bulged section.

12. The apparatus according to claim 1 wherein the frame comprises a pair of end posts, a top rail and a bottom rail.

13. The apparatus according to claim 1 wherein the outwardly bulged section has a height greater than 15 inches.

14. The apparatus according to claim 1 wherein the outwardly bulged section is defined by a vertical wall section parallel to the frame, and inclined top and bottom wall sections extending outwardly from the frame to the vertical wall section.

15. The apparatus according to claim 1 wherein the outwardly bulged section has a bulge distance of at least 2.0 inches.

16. The apparatus according to claim 1 wherein the sheet is attached to an outside surface of the frame and the outwardly bulged section extends outwardly therefrom.

17. The apparatus according to claim 1 wherein the outwardly bulged section is located at a distance of the order of 4.0 feet from the base.

18. The apparatus according to claim 1 wherein the base extends outwardly from a bottom of each panel and the outwardly bulged section does not extend outwardly to an distance greater than the base.

19. The apparatus according to claim 1 wherein the ends of the outwardly bulged section are tapered toward the outer surface of the section so as to allow stacking of the panels one on top of the other while the outwardly bulged sections nest.

\* \* \* \* \*